US005761290A

United States Patent [19]

Farris et al.

[11] Patent Number: 5,761,290
[45] Date of Patent: *Jun. 2, 1998

[54] ALTERNATE SERVICE ACTIVATION

[75] Inventors: Robert D. Farris, Sterling; John Carman, Arlington, both of Va.; William Tolson, Silver Spring, Md.

[73] Assignee: Bell Atlantic Network Services, Inc., Arlington, Va.

[*] Notice: The term of this patent shall not extend beyond the expiration date of Pat. No. 5,418,844.

[21] Appl. No.: 540,701

[22] Filed: Oct. 11, 1995

[51] Int. Cl.⁶ .................................................. H04M 3/42
[52] U.S. Cl. ...................... 379/207; 379/201; 379/219; 379/230; 379/279
[58] Field of Search .......................... 379/207, 67, 210, 379/211, 212, 216, 230, 112, 101, 115, 127, 269, 279, 201, 219, 229

[56] References Cited

U.S. PATENT DOCUMENTS

| 4,191,860 | 3/1980 | Weber | 379/115 |
| 4,611,094 | 9/1986 | Asmuth et al. | 379/201 |
| 4,611,096 | 9/1986 | Asmuth et al. | 379/207 |
| 4,788,718 | 11/1988 | McNabb et al. | 379/113 |
| 4,899,373 | 2/1990 | Chinmei Lee et al. | 379/207 |
| 5,247,571 | 9/1993 | Kay et al. | 379/207 |
| 5,418,844 | 5/1995 | Morrisey et al. | 379/207 |
| 5,519,772 | 5/1996 | Akman et al. | 379/207 |
| 5,524,146 | 6/1996 | Morrisey et al. | 379/207 |
| 5,533,115 | 7/1996 | Hollenbach et al. | 379/207 |
| 5,572,583 | 11/1996 | Wheeler, Jr. et al. | 379/229 |
| 5,583,920 | 12/1996 | Wheeler, Jr. | 379/207 |
| 5,594,789 | 1/1997 | Seazholtz et al. | 379/207 |

*Primary Examiner*—Daniel S. Hunter
*Assistant Examiner*—Scott Wolinsky
*Attorney, Agent, or Firm*—Lowe, Price, LeBlanc & Becker

[57] ABSTRACT

A peripheral platform, such as an Intelligent Peripheral (IP), is provided in a Common Channel Interoffice Signaling (CCIS) network having a Services Control Point (SCP) and intelligent network capabilities. The IP or similar platform provides alternate service activation (ASA) and obviates the necessity for the SCP to store a large number of subscriber service profiles. The IP has a call channel link to central office switches of the telephone network and has a data link to the SCP. On receiving a request for activation of alternate service the IP communicates with the SCP and the SCP communicates with the switching offices to retrieve a subscriber service profile from one central office switch and downloads and double assigns that profile to a second central office switch which may thereafter implement the features in that downloaded profile.

38 Claims, 5 Drawing Sheets

ALTERNATE SERVICE ACTIVATION

TECHNICAL FIELD

The present invention relates to a method and system for providing activation of a service to provide at one telephone network terminal network service features available at facilities at other geographical locations connected to the telephone network.

ACRONYMS

The written description uses a large number of acronyms to refer to various services and system components. Although known, use of several of these acronyms is not strictly standardized in the art. For purposes of this discussion, acronyms therefore will be defined as follows:

Alternate Service Activation (ASA)
Area Wide Centrex (AWC)
Action Control Point (ACP)
Advanced Intelligent Network (AIN)
Advanced Services Platform (ASP)
Common Channel Inter-office Signaling (CCIS)
Data and Reporting System (DRS)
Integrated Service Control Point (ISCP)
North American Memory Plan (NAMP) Number
Private Branch Exchange (PBX)
Private Automatic Branch Exchange (PABX)
Service Control Point (SCP)
Service Management System (SMS)
Service Switching Point (SSP)
Signaling Transfer Point (STP)
Station Message Detail Recording (SMDR)
Service Creation Environment (SCE)
Transaction Capabilities Applications Protocol (TCAP)
Central Office (CO)
Integrated Services Digital Network (ISDN)
Intelligent Peripheral (IP)
Maintenance and Operations Center (MOC)
Multi-Services Application Platform (MSAP)
Service Creation Environment (SCE)
Service Management System (SMS)
Simplified Message Desk Interface (SMDI)

BACKGROUND ART

In recent years, a number of new service features have been provided by an enhanced telephone network, sometimes referred to as an Advanced Intelligent Network (AIN). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signaling (CCIS) link to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

An AIN type network for providing an Area Wide Centrex service was disclosed and described in detail in commonly assigned U.S. Pat. No. 5,247,571 to Kay et al., the disclosure of which is entirely incorporated herein by reference. In AIN type systems such as disclosed in the Kay et al. Patent, announcement and digit functions may be required for certain specific services. For example, a caller may be prompted by a tone or speech announcement to enter a personal identification number (PIN) before obtaining a selected service or modifying certain stored parameters relating to the subscriber's AIN service. In such AIN systems, a switching office of the public telephone network would generate the announcements from some internal platform. In commonly assigned application Ser. No. 08/248,980, which was issued to Wheeler, Jr. et al. as U.S. Pat. No. 5,572,583 on Nov. 5, 1996, the disclosure of which is entirely incorporated herein by reference, there is described the use of an Intelligent Peripheral to provide such announcements, as well as other enhanced auxiliary service features.

In the past, providing sophisticated work at home features has entailed the maintenance of relatively large databases and considerable common channel signaling traffic in an extended network environment. One such system is described in U.S. Pat. No. 5,247,571, issued Sep. 21, 1993 to Kay et al., and commonly assigned with the present application.

The Kay et al. patent describes an area wide centrex service provided in a telephone communication network having a plurality of interconnected central office switching systems, each at a different location. Each of the central office switching systems connects to a number of local telephone lines, a number of which can be designated as members of a business group for a particular customer. Area wide centrex extends a number of service features to the business group over a broad area through multiple central offices by taking the programming intelligence capacity out of the central offices and moving it to a central point. Service features such as call routing are controlled by data stored in a central data base. Establishing or changing services for one or all of a particular customer's lines requires only reprogramming that customer's data in the central data base, without the need to reprogram each central office switch. Also, centrex services such as extension number type intercom dialing and call transfer can be extended across provided to groups of lines connected to different exchanges.

The work-at-home feature allows a home telephone line to selectively operate as a residential line or as a business line on a call-by-call basis. For a business call, the user would preface each call with an access indicator to identify a business call. When an outgoing call from the home line lacks the access indicator, the network processes the call as a standard residential call.

The described system operates as follows: Typically, the telephone of a residential line goes off-hook, and the user dials digits. In the work-at-home feature, a special service key actuation at the originating station, such as the "#" or "*" key, triggers AIN recognition. An SSP type central office then suspends the call and queries the ISCP via the STP(s) to determine which business line the originating line corresponds to.

Typically, the ISCP stores a short table, for example including five telephone numbers, for each business line for which work-at-home calls can originate. The ISCP compares the originating home line number to the stored work-at-home tables for the business group lines and matches the home line number to one of the business lines. Based on the identified business line, the ISCP retrieves processing data for completing the call or providing other services as if the service request originated from the business group line.

The ISCP formulates a response message, again in TCAP format, including the processing data. The TCAP response message format includes data fields for billing information, and the response message will include sufficient information to allow billing for the call against the identified business group line. The ISCP transmits the response message back to the originating central office via the STP(s). The system then executes call processing routines to provide the requested AWC service using the data received from the ISCP.

In response to the access indicator trigger, the area wide centrex service provides business features to the home line just as the service would provide to the office line, including for example extension dialing, call routing control, call transfer, and recording SMDR type information. Outgoing business calls can be billed to the associated office line.

As an alternative to using a form of special key actuation as the access indicator it is possible to use other access indicators or triggers. For example, the home line might be identified for AIN processing, in which case the SSP switch queries the ISCP data base in response to every off-hook. The ISCP then decides whether the current call should be processed as a normal residential call or as an AWC Work-at-Home call, based on information stored in the data base. The stored data might specify Work-at-Home call processing for certain times and/or days of the week. Alternatively, the data might identify whether the Work-at-Home service has been toggled on by an initial call to a common number assigned to the specific business group customer, after which all calls from the home line are processed as AWC calls and can access all features of the AWC service associated with the particular business group. Another approach might be to decide whether the call was a work-at-home call based on the dialed destination number; if the number corresponds to a member of the business group with which the home line is associated, the call is processed and billed as an AWC work-at-home call.

The telephone communication system used to implement the area wide centrex service could also route incoming business calls to the home line. In one embodiment, the incoming calls would be routed to the home line using existing call forwarding options. In future, however, the network would process the incoming calls as AIN type calls and control connection to different destination stations based on data stored in the ISCP. In such a system, each call directed to the business line would also trigger a query to the ISCP. Based on its stored data, the ISCP would instruct the SSP switch to complete the call either to the business line or to the associated work-at-home line. For example, the ISCP might provide data to complete incoming calls to the business line at certain times, but at other specified times, provide data to complete such calls to the home line.

A number of the features provided by the prior art AIN type intelligent networks relate to specialized call processing of incoming calls. Thus U.S. Pat. No. 4,191,860 issued Mar. 4, 1980, to Roy P. Weber discloses a system for providing special processing of incoming calls via a number of local switching offices based on information stored in a central data base. The local and toll offices of the telephone network compile a call data message and forward that message via a CCIS link to the central data base, essentially a Service Control Point or SCP. The data base at the SCP translates the dialed INWATS number, included in the message, into a call control message. The call control message includes an unlisted destination telephone number, which is then returned to the offices of the network via CCIS link. The network uses the call control message to complete the particular call.

U.S. Pat. Nos. 4,611,094 and 4,611,096 both to Asmuth et al. (hereinafter Asmuth et al.) disclose a system for providing custom incoming telephone call processing services to a corporate customer operating at geographically dispersed locations through a plurality of local office switches. A customer program stored in a central data base is accessed to provide instructions to the switches to complete incoming calls to customer locations in accord with special services defined by the corporate customer. Incoming calls to the customer are routed to an Action Control Point (ACP) which typically is a modified toll office. The ACP has a number of "primitive" call processing capabilities, such as providing voice prompts to callers and receiving additional caller inputs. The customer program controls the ACP's to string together the desired primitive call processing capabilities to process each call to the customer. Specified parameters stored in the program, such as time of day, caller location and data inputs responsive to the voice prompts, determine the final customer station to which each call should be completed. The customized call processing disclosed by Asmuth et al. can also include customized billing for calls, e.g. by splitting charges between the customer and the caller. The Asmuth et al. system sets up a billing record for each call in the ACP or toll office. Asmuth et al. also teach procedures for handling of calls directed to a corporate customer when the call serving office does not have all of the capabilities needed for processing the call in accord with the customer's stored program. In particular, upon recognition of the deficiencies of the call serving office, the Asmuth et al. system transfers call processing to a second office having adequate capabilities for completion of the call.

U.S. Pat. No. 4,788,718 issued Nov. 29, 1988, to Sandra D. McNabb et al. suggests centralized recording of call traffic information. The architecture is similar to that disclosed by the earlier discussed patents to Weber and Asmuth et al. to the extent that local and toll offices communicate with a central data base via CCIS link. The McNabb et al. system improves over the incoming call routing provided by the Weber patent and the two Asmuth et al. patents discussed above by adding a data gathering function to the centralized data base which stores the individual customer's call routing program. In McNabb et al. the central data processor provides call attempt records and a traffic data summary of all calls directed to a particular 800 number.

U.S. Pat. No. 4,899,373 issued Feb. 6, 1990, to Chinmei Lee et al. discloses a system for providing special telephone services to a customer on a personal basis, when the customer is away from his or her home base or office. A nationally accessible data base system stores feature data in association with personal identification numbers. A subscriber wishing to use personalized features while away from home base dials a special code from a station connected to any exchange which has access to the data base and presents the personal identification number. The corresponding feature data is retrieved from the data base and stored in the exchange in association with the station from which the request was initiated. The exchange then provides telephone service corresponding to the subscriber's personalized telephone features. A temporary office arrangement may be established in which the personalized features will be immediately available on incoming and outgoing calls for a period of time specified by the subscriber.

DISCLOSURE OF THE INVENTION

Summary

According to the invention the CCIS controlled switched telephone network is provided with a peripheral platform offering one or more auxiliary call processing features. This platform is connected to one or more switching systems and is in data communication with the service control point database. The platform may be a peripheral announcement platform, principally for sending synthesized voice messages and/or receiving dialed digit input information. In a preferred implementation, the platform is an Intelligent Peripheral (IP) offering multiple enhanced auxiliary service features.

The services control point is essentially a central control for the network. In a preferred embodiment of the network, incorporating the peripheral platform, a first signaling communication system for two-way communications of data messages interconnects a number of central office switching systems and connects the central office switching systems to the services control point. A second signaling communication system provides two-way data signaling communications between the peripheral platform and the services control point. The second signaling communication system is separate from the first signaling communication system, the central office switching systems, and the trunk circuits interconnecting the central office switching systems. The second signaling communication system also permits exchange of messages between the peripheral platforms.

The network may include a plurality of the peripheral platforms. One platform may connect to one switching system or to a number of the switching systems. Each such platform provides one or more auxiliary call processing capabilities in response to instructions from the services control point and, according to the present invention implements alternate service activation.

The combination of a plurality of peripheral platforms and a separate second signaling network permits exchange of messages between platforms, without the need to establish a call connection between the platforms through the switching systems and without adding excessive message traffic to the existing signaling network carrying information between the central office switching systems and between the central office switching systems and the services control point.

Two specific architectures for an IP version of the peripheral platform are disclosed. One version uses general purpose computers with appropriate line interfaces. The software run by the computers offers a variety of different enhanced service features, such as voice mail, facsimile mail, voice recognition, etc. The second version includes a number of separate modules for specific identified service features, e.g. a voice mail server, a facsimile mail server, etc.

The ability of the IP to play announcements and collect input information, as either dialed digits (e.g. DTMF inputs) or speech, also provides an automated service platform for input of service activation information, directly by subscribers.

A customer having an having an office telephone and number and varied commonly available advanced features associated with that telephone, such as voice mail, conference calling, call transfer, auto dialing, etc., may desire to work from his or her home or another location served by a telephone network termination. Such customer may also desire to have available at that alternate location the advanced features which are available to him or her at their office telephone. Pursuant to the invention the activation of such an alternate service may be implemented by the customer calling a number assigned to the IP and obtaining connection with the IP. Upon the caller properly identifying him or herself by PIN or the like the calling customer communicates to the IP by voice or DTMF signaling that he or she desires activation of their alternate service activator.

The IP signals the ISCP to activate the work at home service of this subscriber having by, way of example, a home number 301-246-1357 and a work number 703-579-2468. The ISCP communicates through the CCIS network with the end office and SSP for the work number 703-579-2468 and extracts from the storage of the switch in that office the profile for the number 703-579-2468 and records it in the ISCP. The ISCP also sends an appropriate CCIS message to the switch to set a trigger for all incoming calls to the work number 703-579-2468. That trigger will cause such incoming calls to launch a TCAP query to the ISCP for alternate routing information. The alternate routing will direct the connection of the incoming call to the home number 301-246-1357. Thus calls to the subscriber of the activated service will be intercepted without ringing at the office and redirected or forwarded to the home number switch or office.

Pursuant to the invention the ISCP would react to the original activation signal from the IP by signaling the office switch of the subscriber to double assign the equipment and capabilities associated with the office number to the home number 301-246-1357, and to activate alternate billing functionality. The work number profile is downloaded to the home end office switch via the CCIS network and the double assignment of equipment and capabilities is effected.

Alternate billing is effected by setting in the home end office a suitable trigger, such as an asterisk (*) When the home end office and SSP detects the asterisk (*) and the dialed number, for example New York, 212-123-4567, it now has the subscribers business number profile and can determine that profile and destination number call for the use of a designated interexchange carrier (IC) and use that carrier. If the subscriber thus calling from home desires to add another party to the connection, this may be accomplished even though the home phone or number does not have three-way calling service. This is because the office number service profile has been down loaded to the home end office and may be accessed to set up such a call. Thus the subscriber at home may perform a switch hook and set up the three-way call. Because of the asterisk trigger with which the call was initiated the bill will be directed to the office number.

In a converse situation, where the service is activated and a call comes into a centrex office number for the subscriber working at home, the office operator may simply perform a switch hook to the real office number of the subscriber (703-579-2468) which will then transfer to the home number in the manner described above. If the call is to the real office number 703-579-2468 it is transferred or forwarded automatically, as described above, and never reaches the office operator.

A key feature of the invention is that the IP instructed the ISCP to activate the service and the ISCP performed that activation and implementation of the service without the ISCP being required to continually maintain a large database of profiles of all subscribers to the service. Of course the implementation of features at the alternate or home site will depend on the Customer Premise Equipment (CPE) available at that site. This need constitute no serious difficulty inasmuch as the subscriber has the termination connection in the home or alternate site and can merely plug into the RJ-11 jack the office telephone instrument and other office equipment.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODES FOR CARRYING OUT THE INVENTION

Figure 1:
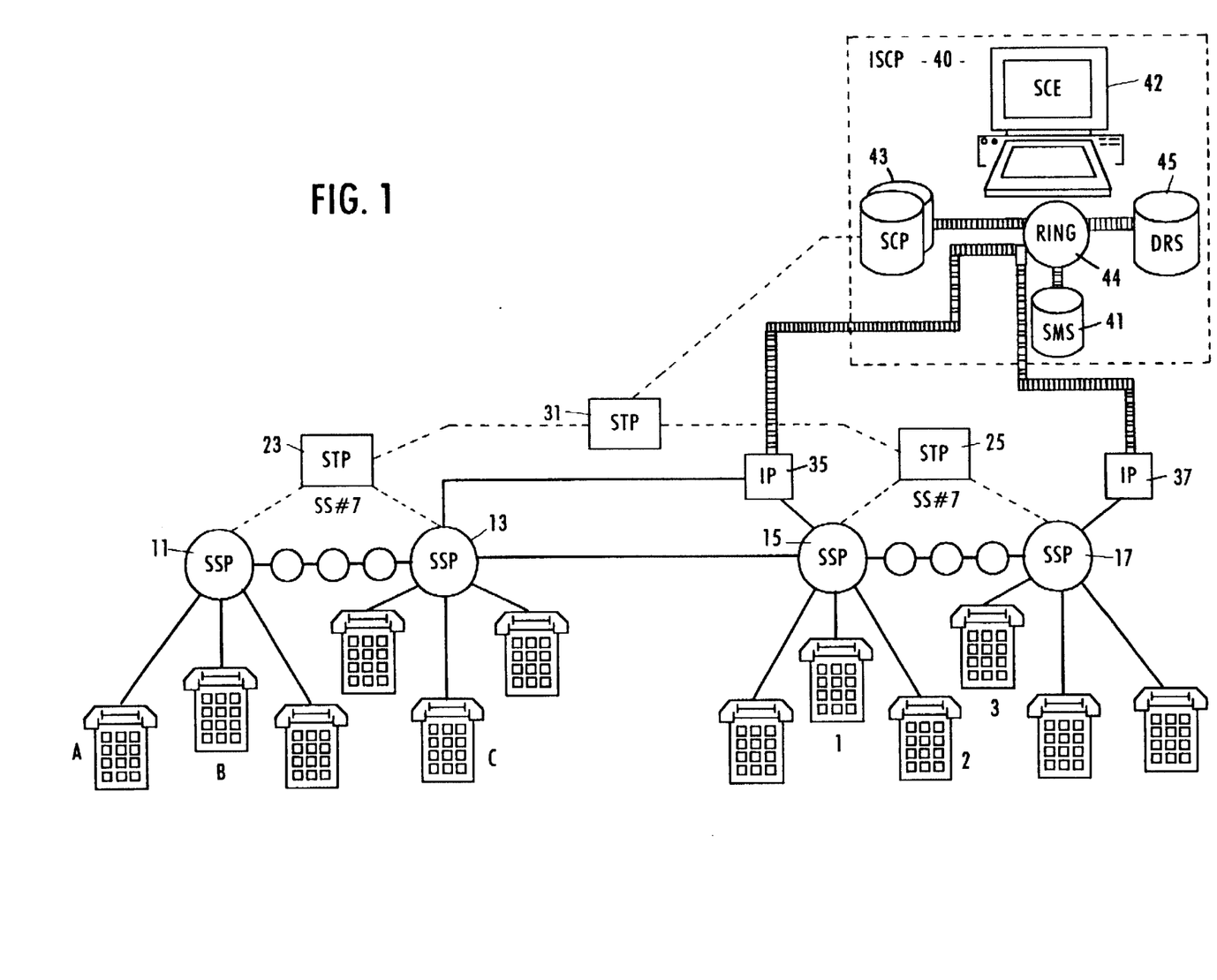
FIG. 1 is a schematic block diagram of an Advanced Intelligent Network architecture of a preferred embodiment of a system for implementing the present invention.

In the first preferred embodiment of the Advanced Intelligent Network, shown in FIG. 1, each central office switching system (CO) 11, 13, 15, 17 is labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls. In the illustrated embodiment, the CO-SSP's are end offices.

As shown in FIG. 1, all of the end office switches 11, 13, 15 and 17 are equipped and programmed to serve as SSP's. The illustrated embodiment is perhaps an ideal implementation which would make a variety of Advanced Intelligent Network (AIN) services widely available at the local office level throughout the network. Other AIN implementations provide the SSP functionality only at selected points in the network, and end offices without such functionality forward calls to one of the SSP's.

Figure 2:
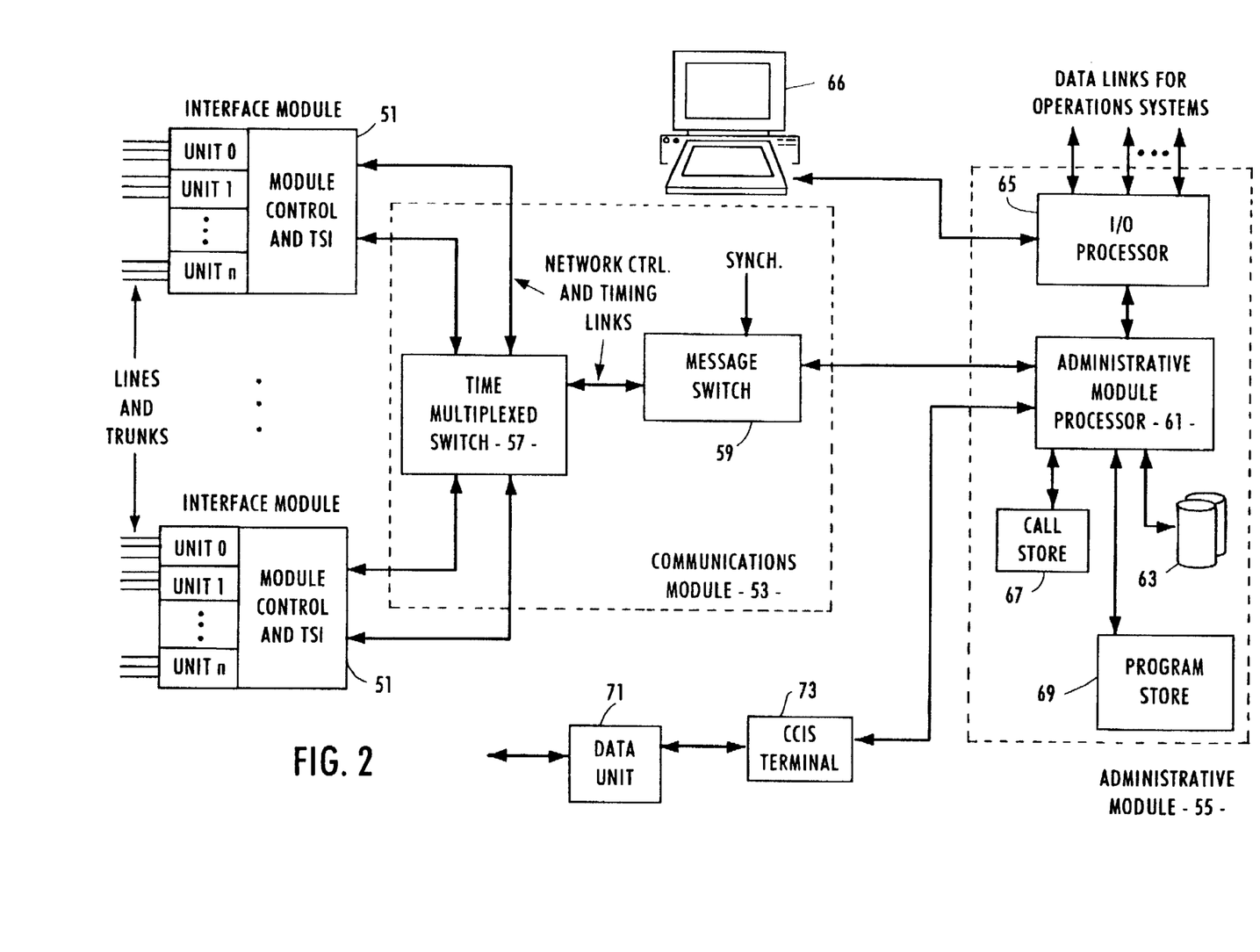
FIG. 2 is a more detailed diagram of one of the SSP type central offices used in the preferred intelligent network implementation of the present invention.

SSP capable central office switching systems typically consist of a programmable digital switch with CCIS communications capabilities. One example of an SSP capable CO switch is a 5ESS type switch manufactured by AT&T; but other vendors, such as Northern Telecom and Seimens, manufacture comparable digital switches which could serve as the SSP's. The structure of an exemplary CO which may serve as the SSP type CO's in the system of FIG. 1 is shown in FIG. 2. FIG. 2 is a simplified block diagram of an electronic program controlled switch which may be used as any one of the SSP type central offices in the system of FIG. 1. As illustrated, the CO switch includes a number of different types of modules. In particular, the illustrated switch includes interface modules 51 (only two of which are shown), a communications module 53, and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disk storage 63, for overall control of CO operations. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signaling link between the administrative module processor 61 and an SS7 network connection to an STP or the like (see FIG. 1A), for facilitating call processing signal communications with other CO's and with the ISCP 40.

As illustrated in FIG. 2, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disk storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

With reference to FIG. 1, the SSP type CO's 11 and 13 connect to a first local area STP 23, and the SSP-CO's 15 and 17 connect to a second local area STP 25. The connections to the STP's are for signaling purposes. As indicated by the circles below STP's 23 and 25, each local area STP can connect to a large number of the SSP-CO's. The central office SSP's are interconnected to each other by trunk circuits (illustrated in FIG. 1 as bold lines) for carrying telephone services.

The local area STP's 23 and 25, and any number of other such local area STP's (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSP's or not, may function primarily as tandem type offices providing connections between trunk circuits only.

The links between the central office switching systems (CO's) and the local area STP's 23 and 25 are typically SS#7 type CCIS interoffice data communication channels. The local area STP's are in turn connected to each other and to the regional STP 31 via a packet switched network. The regional STP 31 also communicates with the ISCP 40 via a packet switched network.

The above described data signaling network between the SSP type central offices and the ISCP is preferred, but other signaling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability, as will be discussed in more detail later.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node.

There could be one or more ISCP's per state, to avoid overloading existing CCIS data links. Alternatively, the ISCP could be implemented on a LATA by LATA basis or on a regional operating company basis, i.e. one database for the entire geographic area serviced by one of the Regional Bell Operating Companies. In fact, if federal regulations permitted, the database service could become nationwide.

The ISCP 40 is an integrated system which includes, among other system components, a Service Management System (SMS), a Data and Reporting System (DRS) and the actual database referred to as a Service Control Point (SCP) 43. The ISCP also typically includes a terminal subsystem referred to as a Service Creation Environment or SCE for programming the database in the SCP 43 for the services subscribed to by each individual business customer. The components of the ISCP are connected by an internal, high-speed data network, such as a token ring network. For simplicity, only the SCP 43 is illustrated in FIG. 1.

Although shown as telephones in FIG. 1, the terminals can comprise any communication device compatible with the line. Where the line is a standard voice grade telephone line, for example, the terminals could include facsimile devices, modems etc.

In accord with the present invention, one or more peripheral platforms are added to the network to provide one or more auxiliary call processing capabilities. As shown in FIG. 1, SSP type central offices 15 and 17 connects to an intelligent peripheral platform 35 and 37 respectively. In the preferred embodiment, the peripheral platforms each connect to the associated SSP switch via a primary rate Integrated Services Digital Network (ISDN) link through an appropriate interface unit in one of the interface modules 51 of the switch (see FIG. 2). The ISDN link carries both voice and signaling data. Alternatively a T-1 link or equivalent may be used. The peripheral platforms also connect via a packet switched data communication network, such as X.25, to the ISCP. The X.25 data communication network forms a second signaling network separate from the SS#7 network and the network of trunk circuits interconnecting the switching offices.

In the simplest form, each peripheral announcement platform comprises a programmed system for receiving dialed digit information and synthesizing voice announcements in response to command data from the ISCP. For example, the peripheral announcement platforms might each include a personal computer with an X.25 interface and a text to speech type voice synthesizer and an ISDN interface. More sophisticated implementations of the peripheral platform, referred to as Intelligent Peripherals (IP's), provide a variety of additional call processing capabilities, as will be discussed in more detail below with regard to FIGS. 4A and 4B.

A central office switching system or CO shown in FIG. 1 normally responds to a service request on a local communication line connected thereto, for example an off-hook followed by dialed digit information, to selectively connect the requesting line to another selected local communication line. The connection can be made locally through only the connected central office switching system. For example, for a call from station A to station B the SSP-CO 11 provides the call connection without any connection to another central office. When the called line connects to a distant station, for example when station A calls station C, the connection is made through the connected central office switching system SSP-CO 11 and at least one other central office switching system SSP-CO 13 through the telephone trunks interconnecting the two central office switches.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office; for example, for a call from station A to station C the query would go from originating SSP-CO 11 to terminating SSP-CO 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices (and/or tandem offices) of the network between the calling and called stations. The receiving central office then provides a ringing signal to the called station and sends ringback tone back through the connection to the calling station.

The call processing routines discussed above are similar to those used in existing networks to complete calls between stations. In an AIN type network with peripheral platforms in accord with the present invention, these normal call processing routines would still be executed for completion of calls not requiring AIN processing or service features provided by the peripheral platform.

In an Advanced Intelligent Network (AIN) type system, such as shown in FIG. 1, certain calls receive specialized AIN type processing under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from disc memory 63, the SSP will detect such triggering events during processing of calls to or from such AIN service subscribers.

The SSP type switches can recognize a variety of events as triggers for activating a query and response type AIN interaction with the ISCP. A number of different AIN triggers are used, depending on the precise type of service the AIN will provide a particular subscriber. For example, if a subscriber has a speech responsive autodialing service, an off-hook immediate trigger might be stored in the translation table file for that subscriber in the SSP. The SSP would detect the trigger each time the subscriber goes off-hook on that line and then attempt to obtain further instructions from the ISCP.

For ordinary telephone service calls, there would be no event to trigger AIN processing; and the local and toll office switches would function normally and process such calls as discussed above, without referring to the SCP database for instructions. In a first mode of operation, an SSP type office (CO or tandem) which detects a trigger will suspend call processing, compile a TCAP formatted call data message and forward that message via a common channel interoffice signaling (CCIS) link and STP(s) to the ISCP 40 which includes the SCP database 43. The ISCP accesses its stored data tables to translate the received message data into a call control message and returns the call control message to the office of the network via CCIS link and STP(s). The SSP then uses the call control message to complete the particular call through the network. For AIN calls requiring a processing feature provided by the peripheral platform, the call control message would instruct the SSP to route the call to the associated peripheral platform.

In the network of FIG. 1, the ISCP 40 transmits a "SEND to RESOURCE" type TCAP message instructing an SSP, such as SSP 17, to access a resource and collect digits. This message identifies a particular resource, in this case an ISDN type voice channel to the associated peripheral platform 37. Each time the ISCP sends such a "SEND to RESOURCE" message to an SSP, the ISCP concurrently sends a message through the X.25 data link to the associated peripheral platform. This message tells the platform what message to play on the specified ISDN channel at that time. If the message announcement platform in the IP has a text-to-speech converter, the announcement could take the form of virtually any desired script.

As shown in FIG. 1, the ISCP 40 includes a Service Management System (SMS) 41, a Data and Reporting System (DRS) 45 and the actual database referred to as the Service Control Point (SCP) 43. The ISCP also typically includes a terminal subsystem referred to as a Service Creation Environment or SCE 42 for programming the database in the SCP 43 for the services subscribed to by each individual customer. These components of the ISCP 40 communicate with each other via a token ring network 44.

The illustrated preferred embodiment includes two signaling communications systems carrying data to and from the ISCP 40. The communications links of the first such signaling network appear in the drawing as dashed lines, and the communications links of the second such signaling network appear in the drawing as lines formed by parallel bars. The first signaling network provides communications between the ISCP 40 and the SSP's 11, 13, 15, 17 and between the individual SSP's 11, 13, 15, 17. The second signaling network provides communications between the ISCP 40 and the IP's 35, 37. More specifically, the SCP 43 connects to the SSP's via the SS#7 network and the STP's 44. For the second signaling communication system a router shown as a small rectangle on the ring 44 provides a two-way communication connection to a data network, for example an Ethernet (IEEE 802.3) type local area network, another token ring, or a mixture of token ring and local area network, etc., going to the individual IP's 35, 37. The second signaling communication system uses a protocol referred to as a TCP/IP (Transmission Control Protocol/Internet Protocol) Other types of high speed data network can be used between the ISCP 40 and the IP's 35, 37. Typically, the second signaling network will provide higher capacity data transport than the first signaling communication network.

One IP may connect to one SSP or alternatively, an IP may connect to two or more switching systems, or two or more IP's may connect to the same switching office. For example, in the network of FIG. 1, the IP 35 connects to two SSP type central office switching systems, 13, 15. The IP 37 connects to one SSP type central office switching system 17. The precise number of IP's in the network and the number thereof connected to different switching systems is determined by projected traffic demands for IP service features from the subscribers' lines connected to the various switching systems.

In the preferred embodiment, the connection from the IP to the SSP would utilize a primary rate ISDN type trunk line for carrying both voice channels and signaling information. However, a number of alternate implementations of this connection can be used. For example, the connection may take the form of a T1 circuit carrying a number of Multiplexed Centrex line channels. If additional data signaling is necessary from the switch to the IP, a Simplified Message Desk Interface (SMDI) link can be provided. SMDI is a standard form of maintenance port, available on many types of telephone switching systems, through which calling party number information can be supplied. For older switching systems not capable of call transfer through ISDN signaling or signaling on T1 Centrex lines, an additional switch could be added between the IP and the SSP.

The AIN topology illustrated in FIG. 1 is exemplary in nature, and other network topologies can be used. For example, the illustrated network includes SSP functionality in each of the end office switching systems. In some networks, at least some of the end offices may not have SSP capabilities. Each such end office would connect to a trunk which in turn feeds calls to a tandem switching system with SSP capabilities. The SSP tandem communicates with the ISCP, as in the implementation described above. For the SSP capable end office switches that may be present in the network, they communicate directly with the ISCP, in the same manner as in the embodiment of FIG. 1. In such networks, each peripheral announcement platform or IP could connect to one or more of the non-SSP end offices, one or more SSP capable end offices and/or to the SSP capable tandem. The SSP capable tandem office switch is a digital switch, such as the 5ESS switch from AT&T; and the non-SSP type end offices might be 1A analog type switches.

Figure 3A:
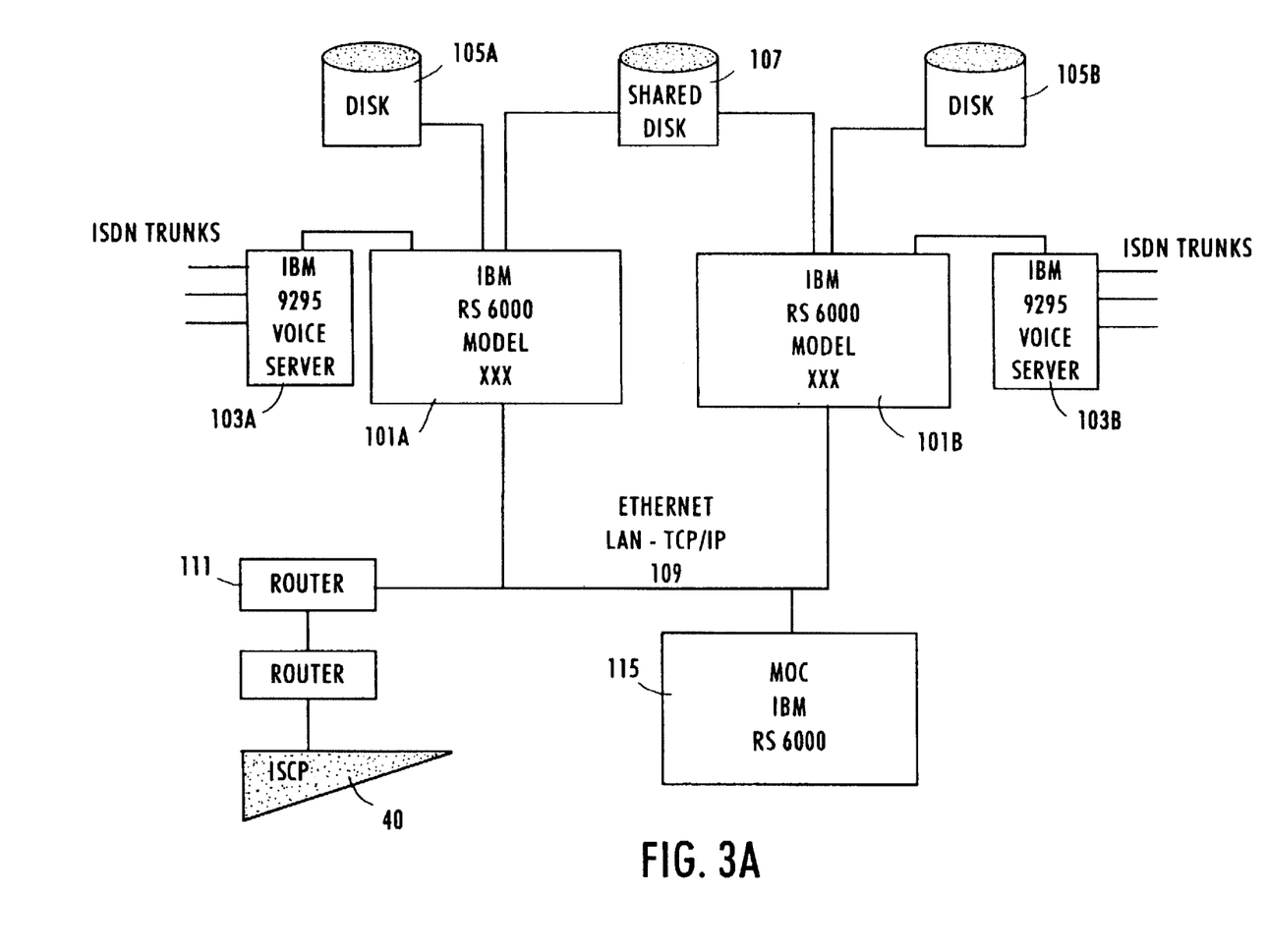
FIG. 3A is a schematic block diagram of one embodiment of an intelligent peripheral for use in the present invention.

FIG. 3A illustrates a first, preferred embodiment of the IP used in the network of FIG. 1. In this implementation, the IP will consist of two or more general purpose computers 101A, 101B, such as IBM RS6000's. Each general purpose computer will include a digital voice processing card for sending and receiving speech and other audio frequency signals, such as an IBM D-talk 600. Each voice processing card will connect to a voice server card 103A or 103B which provides the actual interface to T1 or primary rate interface ISDN trunks to the SSP type switching office. The plurality of computers may have associated dedicated disk storage 105A, 105B, and the IP will included a shared disk memory 107. Each computer will also include an interface card for providing two-way communications over an internal data communications system, an Ethernet type local area network 109. The Ethernet carries communications between the individual computers and between the computers and a router 111 which provides an interconnection to the second signaling communications network going to the ISCP. The IP may also include another general purpose computer 115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup.

Each general purpose computer 101A, 101B will run a node manager, an IP/ISCP Interface program, appropriate voice processing software and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example may replace the announcement and digit collection functions of the SSP switches in various existing AIN services. The general purpose computers and associated circuits will also run a variety of other types of service program modules, for example a voice mail server module and/or a fax mail server module.

Figure 3B:
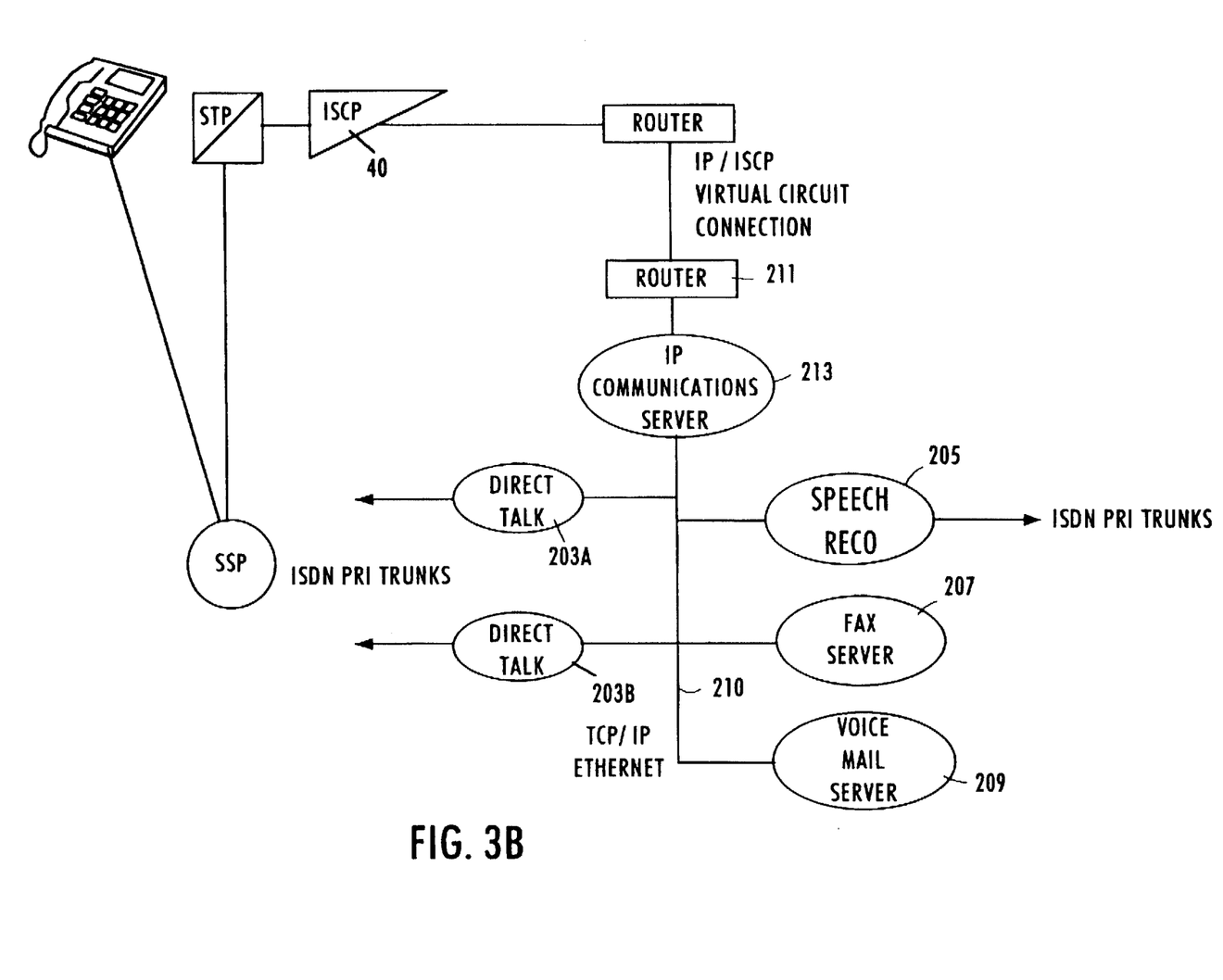
FIG. 3B is a schematic block diagram of an alternate embodiment of an intelligent peripheral for use in the present invention.

FIG. 3B illustrates an alternate embodiment of the IP used in the network of FIG. 1. The alternate architecture utilizes separate modules for different types of services or functions. for example, one or two Direct Talk type voice server modules 203A, 203B for interfacing the trunk to the SSP, a separate module 205 for speech recognition, a server module 209 for voice mail, and another server 207 for fax mail services, etc. The various modules communicate with one another via an data communication system 210, which again may be an Ethernet type local area network.

The Direct Talk modules 203A, 203B provide voice message transmission and dialed digit collection capabilities, as in the earlier embodiment. The modules 203A, 203B also provide line interfaces for communications to and from those servers which do not incorporate line interfaces. For example, for facsimile mail, the Direct Talk module connected to a call would demodulate incoming data and convert the data to a digital format compatible with the internal data communication network 210. The data would then be transferred over network 210 to the fax server 207. For outgoing facsimile transmission, the server 207 would transfer the data to one of the Direct Talk modules over the network 210. The Direct Talk module would reformat and/or modulate the data as appropriate for transmission over the ISDN link to the SSP. The Direct Talk modules provide a similar interface function for the other servers, such as the voice mail server 209.

The illustrated IP also includes a communication server 213. The communication server 213 connects between the data communication system 210 and the router 211 which provides communications access to the second signaling communication system and the ISCP 40 and other IP's which connect to that signaling communication system. The communication server 213 controls communications between the modules within the IP and the second signaling communication system.

In each of the proposed architectures, the SSP switch would route calls to the different elements of the IP in response to instructions from the ISCP. In the initial implementation using general purpose computers (FIG. 3A), each of which offers all service functionalities, the decision to route to a particular one of the computers would be a resource availability/allocation decision. If necessary data can be exchanged between the computers via the internal data communications network, e.g. if a message for a particular subscriber's service is stored in the disc memory associated with one computer but the other computer is actually processing the call. In the second implementation (FIG. 3B), however, the ISCP would instruct the SSP to route the call to the particular line to the specific module capable of providing a calling customer's individual service. For example, if the subscriber has some form of speech recognition service, the call would be routed to the speech recognition module 205. If the subscriber has a voice mail service, however, the ISCP would instruct the SSP to route the call to one of the lines going to one of the voice server modules 203A, 203B. The module 203A, or 203B would receive outgoing voice messages from the voice mail server 209 for transmission to the caller. The module 203A or 203B would decode DTMF signals and supply appropriate data to the voice mail server, for control purposes. The module 203A or 203B would also format incoming voice messages for transmission over internal network 210 and storage by server 209.

Using a proprietary protocol +1129 developed for this purpose, the IP will query ISCP in response to a call. Thus, during a call, a trigger event occurs. The SSP queries the ISCP which responds by instructing the SSP to route the call to the IP, using standard TCAP protocol messages. Using the +1129 protocol, when the SSP routes the call to the IP, then the IP queries the ISCP and receives one or a sequence of instructions as to how to process the particular call. The message set defined by this protocol is as follows:

ProvideInstructions—message sent by the IP to ask ISCP software for information or action in handling a call. Begins a transaction and provides necessary information to start the appropriate MSAP script.

CallInfoToResource—sent by ISCP software to the IP to inform it to play messages to the caller and/or collect and return digits entered by the caller. May inform the IP to terminate the call.

CallInfoFromResource—message sent by the IP in response to the preceding CallInfoToResource message. Includes result code and collected digits.

SwitchInfoToResource—message sent by ISCP software to provide the IP with the information it needs to transfer the call elsewhere. This message and the following one are not part of TA-NWT-001129.

SwitchInfoFromResource—message sent by the IP or ISCP software with the result of the preceding SwitchInfoToResource.

ResourceClear—message may be sent by the IP in response to a preceding CallInfoToResource if that preceding message requested that the call be terminated. Also, may be sent by the IP asynchronously to alert ISCP software that the call was terminated by the customer. This message includes a parameter describing the "cause" for terminating the call.

CancelResourceEvent—message sent asynchronously by ISCP software to terminate the conversation.

Implies abnormal termination. Normally CallInfoToResource is used to terminate a call.

ExtendedInfoToResource—message sent by ISCP software to the IP to provide a standard format for extending the message set above. In this specification, it is used to extend the message set to include the Play Application with information message.

ExtendedFromToResource—message sent by the IP to ISCP software in response to the ExtendedInfoToResource message above.

A modified protocol specified in Bellcore TA-NWT-001129 includes a similar but somewhat smaller message set which may be used for communications between an ISCP and an SSP as an enhancement over the standard TCAP message set.

As an alternative or in addition to the +1129 protocol, communications between the IP and the ISCP may utilize generic data interface (GDI). The GDI command set is simpler and more generic, and the commands can carry more data. Also, the ISCP can initiate communications using GDI. This permits a wider variety of routing and processing routines. In response to a triggering event, the SSP would again receive instructions to route a call in progress to the IP. However, rather than waiting for a subsequent query from the IP, while the SSP is routing the call the ISCP could instruct the IP to prepare to receive a call on a particular circuit. For example, for a call which might require speech recognition processing, the ISCP would instruct the IP to retrieve appropriate recognition templates from memory. Other protocols could be used to permit either the ISCP or the IP to initiate communications.

Figure 4:
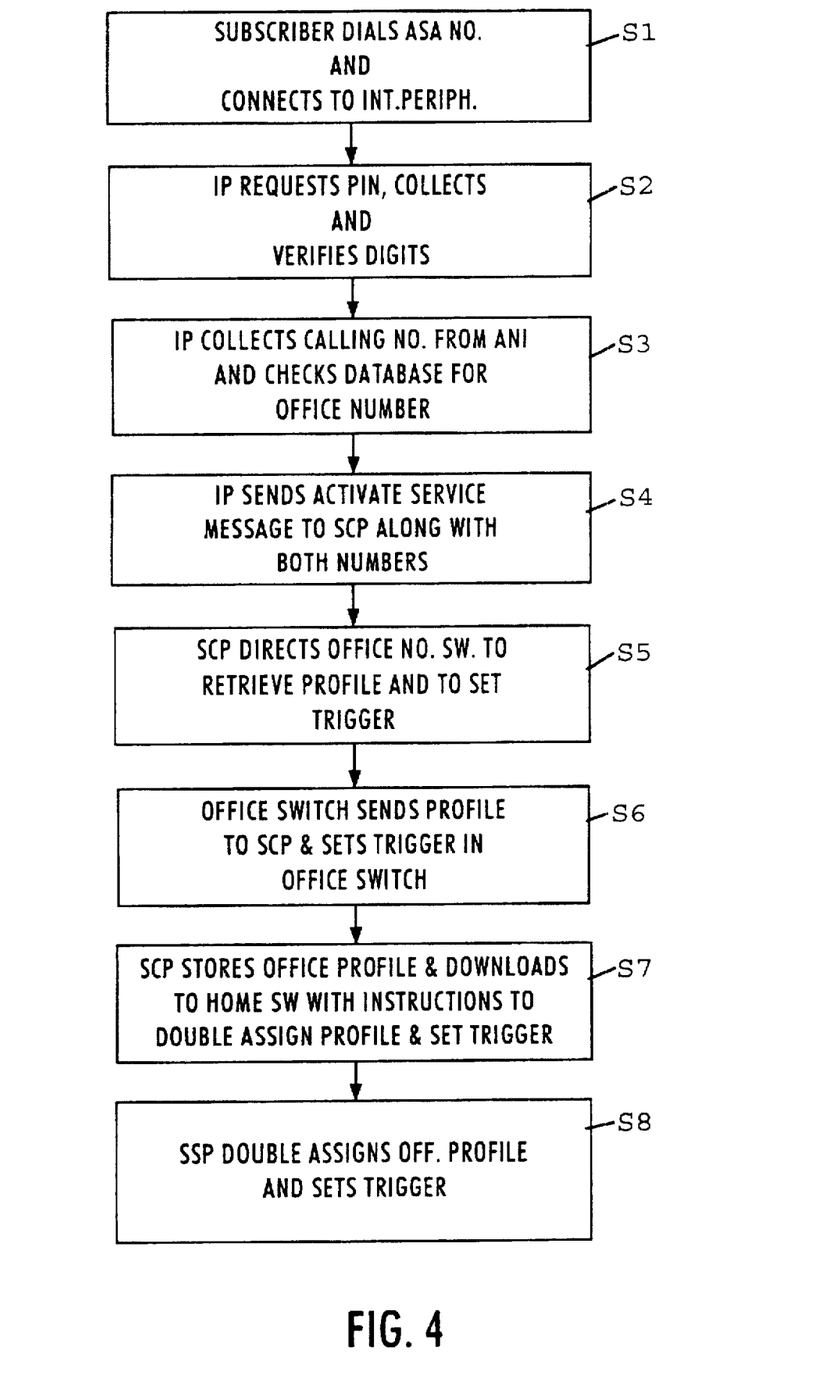
FIG. 4 is a simplified flowchart illustrating operation of a preferred embodiment of alternate service activation according to the invention.

The flowchart of FIG. 4 illustrates the method of operation of the alternate service activation of the invention. The previously described illustrative subscriber having a direct or real office number 703-579-2468, and a home number 301-246-1357, is a subscriber to work-at-home alternate service and desires to activate that service from his or her home number 301-246-1357. At S1 in FIG. 4 the subscriber calls a number which has been established for alternate service activation. Dialing that number at the subscribers terminal 3 results in the subscribers end office switch and SSP 17 effecting connection of the calling subscriber to the Intelligent Peripheral (IP) 37 via the T1 or ISDN connection between the switch 17 and IP 37. The particular number dialed is translated by the IP as a call for alternate service activation.

At S2 the IP requests the calling subscriber to key in his or her PIN and verifies that against the calling number obtained by ANI. If the subscriber calls from a number other than the stored home number the IP initiates a voice prompt to the caller requesting the alternate or home number for which the service has been established. The subscriber enters that number by DTMF keying. The IP thereupon requests the PIN and verifies the PIN against that alternate number which is stored at the IP. According to one embodiment the other alternate number, the office number, is also stored in a database at the IP. According to an alternate embodiment the alternate number database may be stored at the SCP database 43.

In the embodiment in which the database is maintained at the IP, at S3 the IP checks the IP database for the alternate number to match the number obtained from ANI or by DTMF from the caller. At S4 the IP formulates and sends a message to the ISCP 40 requesting the activation of alternate service for the two numbers, which are also supplied to the ISCP in the message from the IP. According to the alternate option where the database is maintained at the SCP, the IP sends a message requesting alternate service activation for the one number obtained from ANI or DTMF identification. The ISCP then obtains the second number from its database 43. Pursuant to both options the ISCP now has both numbers and the request for activation of the service.

At S5 the ISCP sends a message to the SSP 15 of the office number 703-579-2468 connected to terminal 1. This message directs that SSP to send from its storage 63 a copy of the subscriber service profile for the office number 703-579-2468. In the same message the ISCP directs the office SSP to set a trigger for calls to 703-579-2468 so that those calls are forwarded to the alternate number 301-246-1357.

At S6 the office SSP 15 complies with the request message from the ISCP and sends a copy of the subscribers office service profile to the ISCP and sets the requested trigger in that SSP.

At S7 the ISCP receives and stores the business service profile in its database 43, and immediately downloads the profile to the subscribers home switch 17 with instructions to that SSP to double assign that equipment (the office service profile for 703-579-2468) to the home number 301-246-1357. The ISCP includes in that message instructions to the home office SSP to set a trigger to activate alternate billing functionality.

At S8 the home SSP 17 double assigns the office service profile and sets the trigger for alternate billing functionality. The alternate service of the subscriber has now been activated.

Alternate billing is effected by setting in the home end office a suitable trigger, such as an asterisk (*). When the home end office SSP detects the asterisk (*) and the dialed number, for example New York, 212-123-4567, it now has the subscribers business number profile and can determine from that profile and destination number that it is to use a designated interexchange carrier (IC), whereupon that carrier is used. If the subscriber thus calling from home desires to add another party to that connection, this may be accomplished even though the home phone or number does not have three-way calling service. This is because the office number service profile has been down loaded and double assigned to the home end office and may be accessed to set up such a call. Thus the subscriber at home may perform a switch hook and set up the three-way call. Because of the asterisk trigger with which the call was initiated the bill will be directed to the office number.

In a converse situation, where the alternate service is activated and a call comes into an operator attended centrex office number for the subscriber working at home, the office operator may simply perform a switch hook to the real office number of the subscriber (703-579-2468) whereupon the call will then be transferred to the home number in the manner described above. If the call is to the real office number 703-579-2468, i.e., not through the office attendant or operator, it is transferred or forwarded automatically, as described above, and never reaches the office operator.

A key feature of the invention is that the IP instructs the ISCP to activate the service and the ISCP performs that activation and implementation of the service without the ISCP being required to continually maintain a large database of profiles of all subscribers to the service. While implementation of office features at the alternate or home site will depend on the Customer Premise Equipment (CPE) available at that site, this creates no serious difficulty inasmuch as the subscriber has the termination connection in the home or alternate site and can merely plug into an RJ-11 or the like jack the office telephone instrument and other office equipment or substitutes therefor. The use of intelligent peripherals in public switched telephone networks is becoming more common and IPs such as described herein are capable of being programmed to implement the alternate service activation of the invention.

Although several preferred embodiments of the invention have been described in detail above, it should be clear that the present invention is capable of numerous modifications as would be apparent to one of ordinary skill in the art. Such modifications fall within the purview of the appended claims.

I claim:

1. In a communication network, comprising:
   local communication lines,
   a plurality of separately located central office switching systems interconnected via trunk circuits for selectively providing switched call connections between at least two of the local communication lines:
   a services control point separate from the central office switching systems, comprising a database storing call processing data associated with a plurality of the local communication lines for control of call processing through one or more of the central office switching systems;
   a first signaling communication system for two-way communications of data messages, said first signaling communication system interconnecting the central office switching systems and connecting the central office switching systems to the services control point;
   a peripheral platform connected to at least one of the central office switching systems via a call connection channel said peripheral platform comprising means for providing at least one service activation processing capability via the call connection channel; and
   a second signaling communication system separate from the first signaling communication system and the central office switching systems, for providing two-way communications of data messages between the peripheral platform and the services control point:
   a service activation processing method comprising the steps of:
   receiving a request for service activation via one of the communication lines:
   providing a call connection from said one of the communication lines to a peripheral platform;
   communicating between said peripheral platform and said services control point and identifying a service activation processing function to be executed by said services control point in response to said communication;
   executing the identified service activation processing function via said first signaling communication system;
   wherein said service activation processing function includes the step of copying data stored at a first of said central office switching systems into storage at a second of said central office switching systems.

2. A method according to claim 1 including the step of temporarily storing said data at the database of said services control point.

3. A method according to claim 1 including the step of setting a trigger at least one of said first and second central office switching systems.

4. A method according to claim 1 including the steps of setting a trigger at each of said first and second central office switching systems.

5. A method according to claim 4 wherein one of said triggers when triggered activates alternate billing functionality.

6. A method according to claim 5 wherein the other of said triggers when triggered initiates a call forwarding routine.

7. A method according to claim 6 wherein said call forwarding routine includes transmitting via said first signaling communication system an inquiry to said services control point.

8. A method according to claim 6 wherein said call forwarding routine includes transmitting an inquiry to and receiving a response from said services control point via said first signaling communication system.

9. A method according to claim 1 wherein said data comprises subscriber service profile data.

10. A method according to claim 9 including the step of double assigning said service profile data.

11. A method according to claim 9 wherein said local communication lines comprise telephone lines, and said central office switching systems comprise telephone switches.

12. A method according to claim 11 wherein said peripheral platform comprises means for transmitting voice messages and receiving dialed digit signals.

13. A method according to claim 11 wherein said first signaling communication system is a common channel interoffice signaling network.

19

14. A method according to claim 13 wherein said second signaling communication system is an X.25 network.

15. A method according to claim 13 wherein said local communication lines comprise telephone lines, and said central office switching systems comprise telephone switches interconnected to each other by voice telephone type trunk circuits separate from said common channel interoffice signaling system.

16. In a communication system comprising:

at least two switching offices, interconnected by trunk circuits, for selectively providing switched communication services over a plurality of communication lines connected thereto; and a central control separate from the switching offices, said central control comprising a database storing call processing data associated with a plurality of said communication lines for control of call processing through one or more of said switching offices;

a service activation processing method comprising the steps of:

receiving a request for service activation via one of said communication lines;

providing a call connection from said one of said communication lines to a peripheral platform;

communicating between said peripheral platform and said central control and identifying a service activation processing function to be activated in response to said request for service; and activating the identified service activation processing function; said step of activating the identified service activation processing function comprising:

retrieving data stored in a first switching office; and transmitting the retrieved data from the first switching office to a second switching office.

17. A method according to claim 16 including the step of temporarily storing the data at the central control database before transmitting it to the second switching office.

18. A method according to claim 16 wherein said retrieving and transmitting is over a communication network separate from any lines or trunks.

19. A method according to claim 18 wherein said communication between said peripheral platform and said central control is over a communication network separate from any lines or networks connected to said switching offices.

20. In a telecommunication network, comprising:

local communication lines;

a plurality of separately located central office switching systems interconnected via trunk circuits for selectively providing switched call connections between at least two of the local communication lines, said central office switching systems having stored in databases in said central offices service profiles for the directory numbers associated with the local communication lines connected thereto;

a services control point, separate from the central office switching systems, comprising a database storing call processing data associated with a plurality of the local communication lines for control of call processing through one or more of the central office switching systems;

a first signaling communication system for two-way communications of data messages, said first signaling communication system interconnecting the central office switching systems and connecting the central office switching systems to the services control point;

a peripheral platform connected to at least one of the central office switching systems via a call connection

20 channel, said peripheral platform comprising means for providing at least one auxiliary call processing capability via the call connection channel; and a second signaling comnununication system, separate from the first signaling communication system and the central office switching systems, for providing two-way communications of data messages between the peripheral platform and the services control point;

a service activation processing method comprising the steps of:

receiving a request for service activation via one of said communication lines;

providing a call connection from said one of said communication lines to a peripheral platform;

communicating between said peripheral platform and said services control point to identify the service activation processing function to be executed by said services control point in response to said communication;

retrieving from one of said central office switching systems a service profile identified from said request;

storing said service profile at said services control point; and transferring said service profile from said storage in said services control point to a second central office switching system and associating said service profile with a directory number associated with a local communication line connected to said second central office switching system.

21. A method according to claim 20 including the step of setting a trigger at least one of said first and second central office switching systems.

22. A method according to claim 20 including the steps of setting a trigger at each of said first and second central office switching systems.

23. A method according to claim 22 wherein said trigger at said second central office switching system, when triggered, activates alternate billing functionality.

24. A method according to claim 23 wherein said trigger at said first central office switching system, when triggered, initiates a call forwarding routine.

25. A method according to claim 24 wherein said call forwarding routine includes transmitting via said first signaling communication system an inquiry to said services control point.

26. A method according to claim 24 wherein said call forwarding routine includes transmitting an inquiry to and receiving a response from said services control point via said first signaling communication system.

27. A method according to claim 20 wherein associating said service profile with a directory number associated with a local communication line connected to said second central office switching system comprises double assigning that service profile.

28. A communication network, comprising:

local communication lines;

a plurality of separately located central office switching systems interconnected via trunk circuits for selectively providing switched call connections between at least two of the local communication lines;

a services control point, separate from the central office switching systems, comprising a database storing call processing data associated with a plurality of the local communication lines for control of call processing through one or more of the central office switching systems;

a first signaling communication system for two-way communications of data messages, said first signaling communication system interconnecting the central office switching systems and connecting the central office switching systems to the services control point;

a peripheral platform connected to at least one of the central office switching systems via a call connection channel, said peripheral platform comprising means for providing at least one service activation processing capability via the call connection channel, said peripheral platform on receiving a request for service activation via a call connection to one of the communication lines communicating with said services control point and identifying a service activation processing function to be executed by said services control point in response to said communication; and a second signaling communication system, separate from the first signaling communication system and the central office switching systems providing two-way communications of data messages between the peripheral platform and the services control point including said communications identifying a service activation function;

said services control point executing the identified service activation processing function via said first signaling communication system wherein;

said executing of said service activation processing function includes transmitting data stored at one of said central office switching systems to another of said central office switching systems.

29. A network according to claim 28 wherein said peripheral platform comprises means for transmitting voice messages and receiving dialed digit signals.

30. A network according to claim 28 wherein said first signaling communication system is a common channel interoffice signaling network.

31. A network according to claim 30 wherein said second signaling communication system is an X.25 network.

32. A network according to claim 30 wherein said local communication lines comprise telephone lines, and said central office switching systems comprise telephone switches interconnected to each other by voice telephone type trunk circuits separate from said common channel interoffice signaling system.

33. A communication system comprising:
at least two switching offices, interconnected by trunk circuits, for selectively providing switched communication services over a plurality of communication lines connected thereto;

a central control separate from the switching offices, said central control comprising a database storing call processing data associated with a plurality of said communication lines for control of call processing through one or more of said switching offices; and a peripheral platform including a processor and database storage, said peripheral platform being connected to said central control via a data channel and to one of said switching offices via a call channel;

said peripheral platform responsive to being connected via a call channel and at least one switching office to a communication line and receiving from said communication line a request for activation of a subscriber service, communicating with said central control via said data channel to identify the subscriber service requesting activation;

said central control responsive to said communication with said peripheral platform effecting retrieval of data stored in one of said switching offices and downloading a copy thereof to storage in a second of said switching offices for use by said second switching office in serving one of said communication lines connected thereto.

34. A system according to claim 33 wherein said central control temporarily stores said retrieved data before downloading said data to said second switching office.

35. A system according to claim 33 wherein said central control responsive to said communication with said peripheral platform sets a trigger at least at one of said first and second switching offices.

36. A system according to claim 33 wherein said central control responsive to said communication with said peripheral platform sets a trigger at each of said first and second switching offices.

37. A system according to claim 36 wherein said trigger at said second central office switching system, when triggered, activates alternate billing functionality.

38. A system according to claim 36 wherein said trigger at said first central office switching system, when triggered, initiates a call forwarding routine.

* * * * *